Patented Mar. 30, 1954

2,673,852

UNITED STATES PATENT OFFICE 2,673,852

ERGOT SEPARATION

George Shahovskoy, Indianapolis, Ind., assignor to Eli Lilly and Company, Indianapolis, Ind., a corporation of Indiana No Drawing. Application November 30, 1951, Serial No. 259,301

4 Claims. (Cl. 260—285.5)

My invention relates to the separation of ergot from cereal grains and more particularly to a flotation method that is especially useful in obtaining on an efficient, economical, commercial basis, large quantities of ergot in proper condition for use in the manufacture of drugs and yet which, at the same time, permits the remaining grain to be salvaged for use in feed products.

A vital consideration in any separation process wherein the separated ergot is to be useful in drug manufacture is that such separated ergot must retain certain chemical substances normally present therein and known as alkaloids, which latter are important ergot drugs.

As is well known, ergot is poisonous when improperly administered. It is obtained from cereal grains whereon it occurs as a hard mass of fungus. Such ergot-containing grain is hereinafter referred to as ergoty grain. The ergot is often only partially separated from the grain kernel on the stock and closely resembles the kernel or seed in size and shape being usually only slightly larger than but having a dark brown-purplish or black hue in contrast to the golden color of the grain. Hence, apart from the distinctiveness in color the problems arising in effecting a clean separation are implicit and apparent in these similarities.

There is, however, a marked difference in the densities of the grain kernels or seeds and the ergot; the latter, irrespective of the domestic or foreign origin of the ergoty grain being less than 1.15 whereas the grain kernels have a definitely greater specific gravity. This is so in the case of ergoty rye, wheat, barley and brome grass, and the seeds of these grains when full and ripe are always above that figure even with the pericarp attached such as in the case of barley seed.

This differential in density has led to experimentation in effecting ergot-grain separation by flotation methods with some success and even to commercial use of such methods in cases where the end objective sought was simply the separation of the grain from the poisonous ergot with little or no regard as to the remaining ergot, or its suitability for use in connection with the manufacture of drugs.

One known ergot-floating medium used in such separating procedures comprises a 20 percent saline solution (forty pounds of common salt dissolved in twenty-five gallons of water). In this method the ergoty-grain is immersed in the solution and the ergot bodies float to the surface where they may be skimmed off. The grain seeds are thereafter washed in fresh, clean water to remove the salt. One disadvantage inherent in this method arises from the high surface tension of the aqueous salt solution which tends to cause air entrapment to take place not only in connection with ergot-grain kernel units wherein only partial separation has been effected on the stock, but as well about the individual grain seeds. Such air entrapment precludes the desired, cleancut, sharp separation. However, a greater disadvantage of this method, more particularly from the aspect of securing ergot suitable for drug manufacture, lies in the fact that the aqueous salt solution reduces the alkaloid content of the ergot either directly by its extractive action during the carrying out of the separation process, or indirectly by rendering the alkaloids susceptive to oxidation and hydrolysis or other degradative processes. This results in a poor yield of ergot and one which is wholly unsuitable for drug manufacturing purposes.

Another ergot-floating medium recited in the literature and concerning separative methods involves the use of a solution of chloroform and alcohol in prescribed proportions. This method, at best, is suitable only for obtaining small quantities of ergot such as might be useful in microscopic or assay procedures. While the air-entrapment of the grain seeds due to the relatively high surface tension of the saline solution is absent in this medium, all of the alkaloid extracting features nevertheless persist, and in greater degree, and the hygroscopic effect of the alcohol component—in view of the water-soluble characteristics of many ergot alkaloids—negatives the use of such a solution at least for purposes of obtaining ergot of a quality suitable for use in drug manufacture.

In consequence of the failures of the above described flotation methods to provide ergot which is retentive of its normally present alkaloid factors so vital to its use in the drug industry, the latter or its suppliers have no choice other than to resort to the antiquated, laborious and costly method of separation by hand which, while providing an ergot that is suitable for drug manufacture, is definitely unsatisfactory for obvious reasons.

I have discovered a flotation method for separating ergot from grain which overcomes all of the foregoing disadvantages.

My new process utilizes a mixture of halogenated and non-halogenated aliphatic hydrocarbons. By employing a suitable mixture of such hydrocarbons all of the large scale handling advantages of the flotation methods are achieved but with a decidedly clean-cut separation and yet the alkaloid factors originally present in the ergot are preserved substantially as intact as where the laborious hand method is used.

I have found that halogenated hydrocarbons, in general, extract an amount of the ergot alkaloids from the ergot fungus and that certain of such halogenated hydrocarbons appear to dissolve the protective dark-colored exterior coating of the ergot fungus whereby the alkaloids are rendered susceptible to some extent to the degradative processes hereinbefore mentioned. I have found, however, that the objectionable alkaloid-extraction and coating dissolution properties of a halogenated hydrocarbon can be obviated by mixing therewith a liquid aliphatic hydrocarbon.

Accordingly, in carrying out the process of my novel invention, I prepare a mixture of halogenated hydrocarbon and an aliphatic hydrocarbon in such proportions that the specific gravity of the resultant mixture lies in a range of about 1.15 to about 1.25.

My process is conveniently carried out by intimately mixing the ergoty grain with a sufficient quantity of the solvent mixture in a suitable container to permit the ready, complete and clean separation of the ergot, which latter rises to the surface of the liquid, while the cereal grain sinks or falls to the bottom of the container and then skimming off the ergot which floats on the surface of the mixture as by means of perforate scoops, screen baskets or the like. It will be understood, of course, that large scale separation of this character contemplates the use of large sized (on the order of 600 gallon capacity) pots or vats equipped with the usual power-driven stirring or agitating blades and that such apparatus may, if desired, include in its organization time-controlled, power-operated skimming devices which are arranged periodically to be moved into association with the vat to skim the ergot from the surface of the solvent mixture.

The halogenated hydrocarbons which have been found to be especially suitable for my new process are liquid halogenated aliphatic hydrocarbons having a specific gravity above about 1.4 and having from 1 to 3 carbon atoms. Preferably, chlorinated hydrocarbons are used, as for example, carbon tetrachloride, chloroform and trichloroethylene. The aliphatic hydrocarbon which I employ in admixture with the halogenated hydrocarbon is preferably a mixture of aliphatic hydrocarbons boiling in the range of about 10 to 160° C., and having a specific gravity ranging from .6 to .8. My invention is not limited to the use of mixtures of the aliphatic hydrocarbons, but individual pure aliphatic hydrocarbons having a specific gravity in the range above specified can be used. Illustrative examples are: pentane, hexane, and heptane and the like. For reasons of economy, however, the mixture of hydrocarbons is preferable, such being available to the trade, as petroleum, ether, naphtha, etc.

A suitable procedure for carrying out my invention is as follows:

1. To a flotation medium consisting of about 169 gallons of naphtha having a specific gravity of about 0.78 and about 206 gallons of carbon tetrachloride and a specific gravity of 1.8—total volume about 375 gallons—in a vat having a capacity of about 600 gallons,
2. Add slowly, with agitation about 1,500 pounds of ergoty grain and stir until thoroughly mixed,
3. Allow to settle 10 to 20 minutes,
4. Skim the floated ergot from the surface of the medium either manually or with a machine-operated screen or perforate scoop and place in suitable drums to be transported to a drying still,
5. Restir medium and its contents for a few minutes, allow to settle and again skim off and remove to drums any ergot that separates, and
6. If an appreciable amount of ergot is obtained on the second separating operation, repeat stirring and skimming procedures as described in the foregoing.

In addition to the admixed carbon tetrachloride-extraction naphtha mixture above specified other solvent mixtures can be used such as, for example: the carbon tetrachloride can be mixed with unmixed aliphatic hydrocarbons such as: pentane, heptane, or normal hexane. Alternatively, chloroform or trichloroethylene or other similar halogenated hydrocarbons can be substituted for the carbon tetrachloride and similarly admixed with the mixed or unmixed aliphatic hydrocarbons above noted or mixed or unmixed aliphatic hydrocarbons of like character.

It will be understood that, upon the emptying of the vat, the settled grain conveniently can be removed from the particular solvent used, and that such grain, after being subjected to conventional evaporative processes can be safely and economically employed in feed products since there is a complete absence of any toxic residue due to alkaloid extraction or otherwise.

From the foregoing, it is seen that I have provided a flotation method for separating ergot from grain on a large scale basis and in such manner as preserves intact in the separated ergot the alkaloid factors originally contained therein and necessary in drug manufacture; and, at the same time have provided a method which renders the separated grain non-toxic and free for use in feed products—all, in a simple, reliable, efficient and economical manner.

I claim:

1. The method of separating ergot from cereal grain which comprises adding ergoty grain to a flotation medium consisting of a mixture of a liquid halogenated hydrocarbon, and an aliphatic hydrocarbon, said medium having a specific gravity within the range of about 1.15 to about 1.25, and recovering the ergot which separates from the grain.

2. The method of separating ergot from cereal grain which comprises adding ergoty grain to a flotation medium consisting of a mixture of a liquid halogenated hydrocarbon having from 1 to 3 carbon atoms and a specific gravity greater than about 1.4, and an aliphatic hydrocarbon having a boiling point within the range of about 10° C. to about 160° C. and a specific gravity within the range of about 0.7 to about 0.8, said medium having a specific gravity within the range of about 1.15 to about 1.25, and recovering the ergot which separates from the grain.

3. The method according to claim 2 in which the halogenated hydrocarbon is a chlorinated hydrocarbon.

4. The method of separating ergot from cereal grain which comprises adding ergoty grain to a flotation medium consisting of a mixture of carbon tetrachloride and naphtha of specific gravity 0.78, said medium having a specific gravity within the range of about 1.15 to about 1.25, and recovering the ergot which separates from the grain.

GEORGE SHAHOVSKOY.

References Cited in the file of this patent

UNITED STATES PATENTS

| Number | Name | Date |
| --- | --- | --- |
| 1,645,096 | Erdmann | Oct. 11, 1927 |

OTHER REFERENCES

J. Phys. Chem., vol. 48, pp. 203–223 (1944).